Aug. 6, 1929.  E. O. HAMILTON  1,723,779
STARTING BOX
Filed Sept. 9, 1927
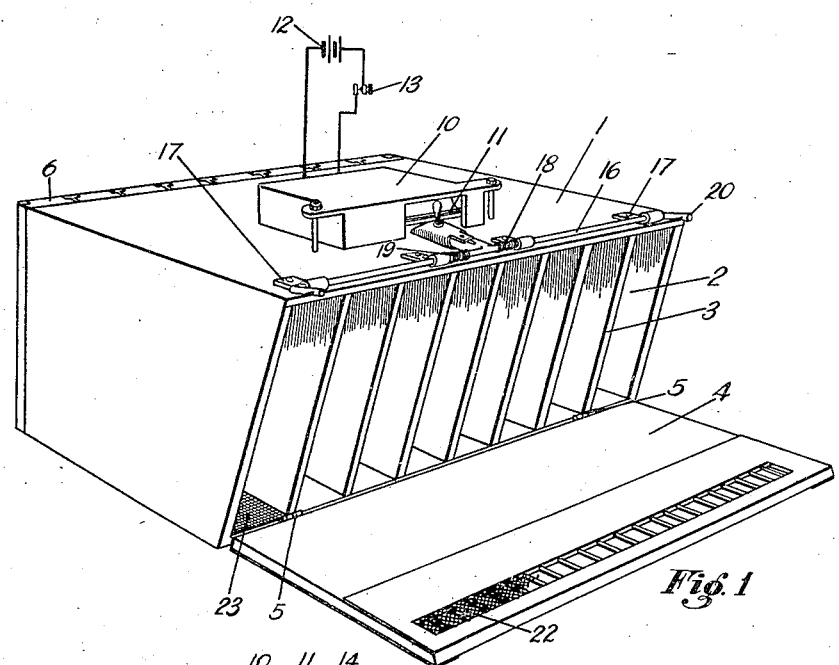
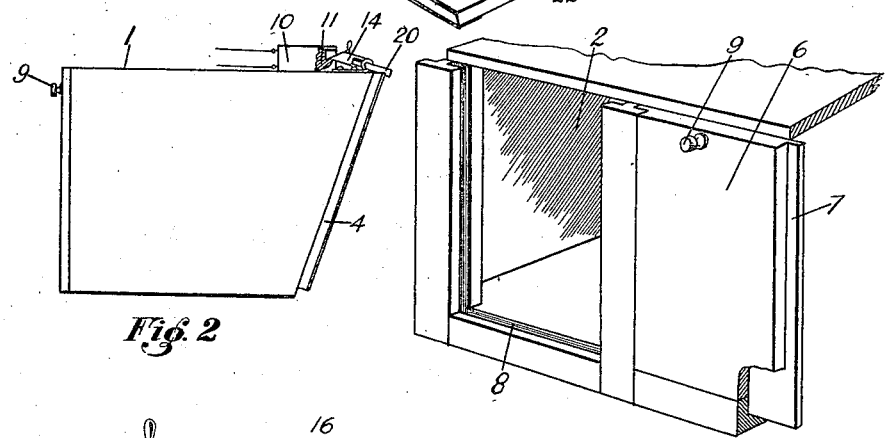
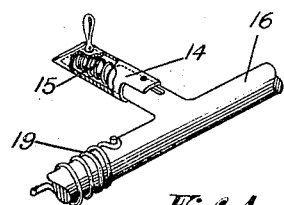
INVENTOR.
Ernest O. Hamilton.
BY
Edwin P. Corbin
ATTORNEY Patented Aug. 6, 1929.

1,723,779

UNITED STATES PATENT OFFICE.

ERNEST O. HAMILTON, OF COLUMBUS, OHIO.

STARTING BOX.

Application filed September 9, 1927. Serial No. 218,550.

My invention relates to starting boxes and, more particularly, to starting boxes wherein racing animals, such as dogs or the like, may be placed prior to running a race and from which the racing animals may be released simultaneously in order that the animals may have an equal opportunity of starting in the race.

In starting boxes, as they are usually constructed, a substantially rectangular box is divided up into compartments or stalls by partitions extending crosswise of the box and from the top to the bottom thereof. The rear side of the box is formed by individual doors, one for each compartment or stall, and the front of the box is formed by a single door that is hinged at its top and swings outwardly and upwardly in opening.

A racing animal is placed in each compartment or stall through the hinged doors that form the rearward side of the box and remains in the box until the signal for the race to begin is given whereupon the single door that forms the front of the box is lifted either manually or by means of springs allowing the animals to emerge from the box simultaneously.

Means have been provided in such starting boxes whereby each racing animal may see along the track through glass or barred openings. Such visibility means has previously been at the bottom of the single door that forms the front of the box which tends to cause the animals to develop into "box-fighters" in attempting to get out of the starting box. Also, the doors forming the rearward side of the box being hinged permit light and air to filter into the compartments or stalls through the cracks between the doors and box. Frequently the animals turn around in the box in search of air and by reason of seeing light at the rear of the box. This sometimes prevents them from getting an equal start in the race when the door at the front is opened.

Another disadvantageous feature of previously used starting boxes resides in the fact that the animals are liable to injure themselves to such an extent that they have to be killed since it is a well known fact that the animals spring upwardly and outwardly in emerging from the box. In springing upwardly there is a liability that the animals will strike the door as they emerge causing either minor or serious injury to themselves.

The primary object of my invention is to provide a starting box wherein the disadvantages hereinbefore set forth will be eliminated and wherein the door forming the front of the box will be released automatically and will be so mounted as to drop outwardly and downwardly when released.

Other objects of my invention may be seen in the following detailed description and the preferred embodiment of my invention may be seen in the accompanying drawings wherein similar characters of reference designate corresponding parts and wherein:

Figure 1 is a perspective view of my starting box in its preferred form.

Figure 2 is a side view of the starting box shown in Figure 1 but showing the single door forming the front of the box as being closed and being held in such closed position by a latch.

Figure 3 is a perspective view of the rear of my starting box showing the individual doors through which the dogs are admitted into their respective compartments or stalls.

Figure 4 is a perspective view, with parts broken away, showing the latch for holding the single front door of the starting box in closed position.

Referring to the drawings the numeral 1 designates a starting box that is preferably of such shape that the top of the box is wider than the bottom thereof while the height remains equal throughout all parts. The box 1 is divided up into separate compartments or stalls 2 by means of the partitions 3. A door 4 that is hinged at its bottom as at 5 extends upwardly and outwardly to form the forward side of this box.

Along the rearward side of the box separate doors 6 are provided for each compartment or stall 2. These doors 6 are preferably constructed in the manner shown in Figure 3 wherein flanges 7 on three sides of the doors 6 cooperate with complemental grooves or guideways 8 in the box. A handle 9 on each door provides a means for grasping the door to raise it and permit the racing animals to be placed into their respective compartments or stalls.

An electrically controlled locking device 10 is disposed on the top of the box 1 and embodies a reciprocating bolt 11. Suitable wires connect the mechanism of the locking device 10 with a battery 12 and a switch 13 as shown in Figure 1. A latch 14 that is held in extended position by means of a spring 15 as shown in Figure 4 is so placed as to be adapted to be moved into and out of cooperative relation with the reciprocating bolt 11. The latch 14 forms a part of a rod 16 that extends lengthwise across the forward end of the box 1 and is held thereon by means of fastening devices 17 which prevent any movement except rotation of the rod. Springs 18 and 19 provide a means for maintaining the rod 16 normally in the position shown in Figure 1.

In the operation of this device, the doors 6 on the rear of the box are opened by raising and the racing animals are placed into their respective compartments or stalls whereupon the doors 6 are lowered to closed position. It will be apparent by constructing the doors in the manner shown in Figure 3 that there will be no light or air filtering into the compartments or stalls from the rearward side. The single door 4 is closed and held in closed position by the arms 20 on the rod 16 as shown in Figure 2 prior to the racing animals being placed into their respective compartments or stalls.

A narrow longitudinal slot that is disposed in the upper part of the door 4 and is covered by a screen or other open work material 22 as shown in Figure 1 permits the animals to see along the track and to have access to air at the same time, being in such position as to practically prevent the dogs or other animals from scratching at the door adjacent such slot. Such construction of the door forming the front of the box practically eliminates the danger of the animals becoming "box-fighters." The bottom of the separate compartments or stalls are preferably covered with a mat 23 of rubber or some other suitable material which will permit the animals to spring outwardly from their respective compartments or stalls without slipping. The inner surface of the door 4 may be covered in a similar manner if desired.

It will be understood that the switch 13 which provides a means for completing the circuit between the battery 12 and the electrically operated locking device 10 may be located at any point along the track, for instance in the judges' stand. When this switch 13 is operated to close the circuit between the battery 12 and the electrically operated locking device 10 the reciprocating bolt 11 is drawn backwardly. The mechanism for drawing the reciprocating bolt 11 backwardly may be of any suitable type and no claim is made to such mechanism alone in this application.

As the reciprocating bolt 11 is drawn backwardly the latch 14 is released whereupon it will assume the position shown in Figure 1 under the action of the springs 18 and 19. On the latch 14 assuming the position shown in Figure 1 the arms 20 on the rod 16 which engage the upper edge of the door 4 will be moved upwardly releasing the door 4. The door 4 extending upwardly at an angle from its bottom will drop outwardly and downwardly when the top is so released.

From the drawings and the description it will be apparent that I have provided a device embodying numerous novel features and while it is not believed necessary to enumerate all of the advantages a brief reference to some of them may be desirable.

For instance, I have provided a starting box wherein there will be no light or air entering the various compartments or stalls from the rearward side of the box. This will minimize the possibility of the racing animals turning around in their respective compartments or stalls in quest of light and air. As a further means for minimizing the possibility of the racing animals turning around in their respective compartments or stalls I have provided a means for admitting light and air into the front of the box and have so placed this means that it will be practically impossible for the animals to reach such light and air admitting space with their forefeet. This will eliminate to a large extent the danger of the animals becoming what is commonly known as "box-fighters."

A further advantage of my invention is that the door which forms the front of the box extends outwardly and upwardly from the bottom thereof or from the line at which it is hinged to the box. Furthermore, I have provided means for automatically releasing this door and it will be apparent that when released the door will drop outwardly and downwardly as a result of gravity although means hastening the opening of the door can be employed if desired. It will be apparent that with the door dropping outwardly and downwardly there will be little or no danger of the racing animals striking the door in such a way that they might possibly be injured in emerging from the box.

Having thus described my invention what I claim is:

1. In animal racing apparatus, a starting box comprising a box divided into a plurality of compartments, an individual door for one end of each of said compartments, a single door for the opposite ends of said compartments so mounted as to fall downwardly and outwardly and means for holding said door in upright position.

2. In animal racing apparatus, a box divided into a plurality of compartments, a single door for the ends of said compartments, a hinged connection between the lower side of said door and the bottom of said box, means for holding said door in upright position, said means comprising an electrically controlled releasing means, and means for operating said releasing means.

3. In animal racing apparatus, a box divided into a plurality of compartments, a single door for the ends of said compartments, a hinged connection between the lower side of said door and the bottom of said box, means for holding said door in upright position, said means comprising an automatic latching device and electrically controlled means for releasing said latching device said means including a reciprocating bolt.

4. In animal racing apparatus, a starting box comprising a box-like structure divided into compartments, each provided at its rear with a closing door and having its forward side provided with a single door having an opening along the top thereof, a hinged connection between said door and the bottom of said box like structure, and remotely controlled releasing means for holding said door upright.

5. In animal racing apparatus, a starting box comprising a box-like structure divided into compartments, each provided at its rear with a closing door and having its forward side provided with a single door having an opening near the top thereof, said last named door being so inclined as to move outwardly and downwardly when said holding means is released, a hinged connection between the lower edge of said door and said box-like structure, and remotely controlled releasing means for holding said door upright.

6. In animal racing apparatus, a starting box comprising a box-like structure divided into a plurality of compartments, an individual door for the rear end of each of said compartments, said individual doors having a sliding connection with said box structure, and an upwardly and forwardly inclined single door for the forward ends of said compartments hinged to the bottom of the box and adapted to fall to open position by gravity when released.

7. In animal racing apparatus, a starting box comprising a box like structure having at its forward side an upwardly and outwardly inclined door hinged to the bottom of the box, means for holding said door upright including an arm adapted to engage the top of said door, a spring tending to disengage said arm, and a latch for holding said arm engaged with the door against the tendency of said spring.

In testimony whereof I hereby affix my signature.

ERNEST O. HAMILTON.